US011002262B2

(12) United States Patent
Stearns et al.

(10) Patent No.: US 11,002,262 B2
(45) Date of Patent: May 11, 2021

(54) PUMP FOR LIQUID CHROMATOGRAPHY WITH PRESSURE SENSOR

(71) Applicant: Valco Instruments Company, L.P., Houston, TX (US)

(72) Inventors: Stanley D. Stearns, Houston, TX (US); Martin P. Brisbin, Houston, TX (US)

(73) Assignee: Valco Instruments Company, L.P., Houston, TX (US)

( * ) Notice: Subject to any disclaimer, the term of this patent is extended or adjusted under 35 U.S.C. 154(b) by 0 days.

(21) Appl. No.: 16/253,093

(22) Filed: Jan. 21, 2019

(65) Prior Publication Data

US 2019/0264671 A1    Aug. 29, 2019

Related U.S. Application Data

(60) Provisional application No. 62/635,016, filed on Feb. 26, 2018.

(51) Int. Cl.
*F04B 19/22* (2006.01)
*B01D 15/16* (2006.01)
*G01N 30/36* (2006.01)

(52) U.S. Cl.
CPC ............ *F04B 19/22* (2013.01); *B01D 15/163* (2013.01); *G01N 30/36* (2013.01); *F04B 2205/04* (2013.01)

(58) Field of Classification Search
CPC .... F04B 19/22; F04B 19/006; F04B 2205/04; G01N 2030/326; G01N 30/32; G01N 30/36; B01D 15/163
See application file for complete search history.

(56) References Cited

U.S. PATENT DOCUMENTS

| | | | | |
|---|---|---|---|---|
| 4,808,092 A * | 2/1989 | Funke | ..................... | F04B 13/00 417/454 |
| 5,201,272 A * | 4/1993 | Simon | ..................... | B41F 13/24 101/153 |
| 5,393,420 A | 2/1995 | Hutchins et al. | | |
| 6,257,052 B1 | 7/2001 | Zelechonok | | |
| 7,204,264 B2 * | 4/2007 | Crocker | ..................... | F15C 5/00 137/15.01 |
| 2005/0031722 A1 | 3/2005 | Takao et al. | | |
| 2012/0290147 A1 * | 11/2012 | Claxton | ................. | G01G 3/141 701/1 |
| 2013/0334117 A1 | 12/2013 | Joudrey et al. | | |
| 2014/0197247 A1 | 7/2014 | Stearns et al. | | |
| 2016/0268825 A1 * | 9/2016 | Byrne | ................... | H02J 7/0042 |

(Continued)

FOREIGN PATENT DOCUMENTS

WO    2012/122977 A1    9/2012

OTHER PUBLICATIONS

Lee W. Young, Notification of Transmittal of the International Search Report and the Written Opinion of the International Searching Authority, or the Declaration—PCT/US19/18735, dated Apr. 24, 2019, 1 page, United States Patent and Trademark Office as the International Searching Authority, Alexandria, Virginia, USA.

(Continued)

*Primary Examiner* — Dominick L Plakkoottam
(74) *Attorney, Agent, or Firm* — Crain, Caton & James, P.C.; James E. Hudson, III

(57) ABSTRACT

A pump for high-pressure and/or nano-scale volumes permits identification of the internal pressure of the pump.

5 Claims, 3 Drawing Sheets

(56) References Cited

U.S. PATENT DOCUMENTS

2017/0145994 A1* 5/2017 Stearns ............... F04B 53/1077
2018/0147519 A1* 5/2018 Van Goor ............... F04B 19/22

OTHER PUBLICATIONS

Lee W. Young, International Search Report—PCT/US19/18735, dated Apr. 24, 2019, 2 pages, United States Patent and Trademark Office as the International Searching Authority, Alexandria, Virginia, USA.

Lee W. Young, Written Opinion of the International Searching Authority—PCT/US19/18735, dated Apr. 24, 2019, 7 pages, United States Patent and Trademark Office as the International Searching Authority, Alexandria, Virginia, USA.

* cited by examiner

PUMP FOR LIQUID CHROMATOGRAPHY WITH PRESSURE SENSOR

CROSS-REFERENCE TO RELATED APPLICATIONS

This application claims the benefit of U.S. Provisional Application No. 62/635,016, filed Feb. 26, 2018.

STATEMENT REGARDING FEDERALLY SPONSORED RESEARCH OR DEVELOPMENT

Not Applicable.

BACKGROUND OF THE INVENTION

1. Field of Invention

The present disclosure pertains to pumps for use with liquid chromatography. More particularly, the present disclosure pertains to a pump of nanoliter-sized volumes which permits identification and control of the pressure of the volume at output.

2. Description of the Related Art

High performance liquid chromatography (HPLC) is generally performed using pumps scaled to deliver fluids at flow rates measured in cubic centimeters of fluid per minute. Unfortunately, these systems require relatively large sample volumes, large mobile phase volumes, and large flow rates for analysis and can result in delivery at uneven pressures over time.

It is difficult in these systems to identify, and therefore control, the pressure of fluid from the associated pump head. Problematically, because the barrels of pump may vary from pump to pump, each has a unique pressure profile, preventing a common profile from being accurate.

It would therefore be desirable to provide a pump for high performance liquid chromatography which provides reliable pressure output.

SUMMARY OF THE INVENTION

The present disclosure therefore meets the above needs and overcomes one or more deficiencies in the prior art by providing a pump which provides reliable pressure data and therefore output. The present disclosure therefore provides a lightweight robust flow system which uses a minimum fluid and is appropriate for use as a field portable HPLC unit.

The present disclosure provides a pump for high performance liquid chromatography having a pump main body and a pump head. The pump main body has a main body face with an electrical connector receiver on the main body face, a plunger with a plunger first end, where the plunger extends from the main body face, and a seal separated from the main body face by a spring, such that the plunger passes through the seal. The pump head has a pump head body with a pump head first side, and a barrel in the pump head body where the barrel is sized to fit about the plunger first end and is bounded on one side by the pump head first side. The pump head further has a measurement surface at a distance from an interior surface of the barrel sufficient to withstand an internal pressure of the barrel but is sufficient to deform proportionally to a change in the internal pressure, thus providing a measurable deflection. The pump head further has a pump head face adapted to contact the main body face and for detachable attachment to the pump main body. The pump head further has a set of electrical connectors at the pump head face of the pump head which are adapted to provide electrical communication to the electrical connector receiver on the main body face when the pump head face contacts the main body face. The pump head also has a strain gauge affixed to the pump head adjacent the pump head first side of the pump head body at the measurement surface and adapted to transmit a signal indicative of the deflection and in electrical communication with the set of electrical connectors. Finally, the pump head has a memory device containing a calibration value of the signal indicative of the deflection to pressure in electrical communication with the set of electrical connectors.

Additional aspects, advantages, and embodiments of the invention will become apparent to those skilled in the art from the following description of the various embodiments and related drawings.

BRIEF DESCRIPTION OF THE DRAWINGS

So that the manner in which the described features, advantages, and objects of the invention, as well as others which will become apparent; are attained and can be understood in detail; more particular description of the invention briefly summarized above may be had by referring to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DESCRIPTION OF THE PREFERRED EMBODIMENT

Figure 1:
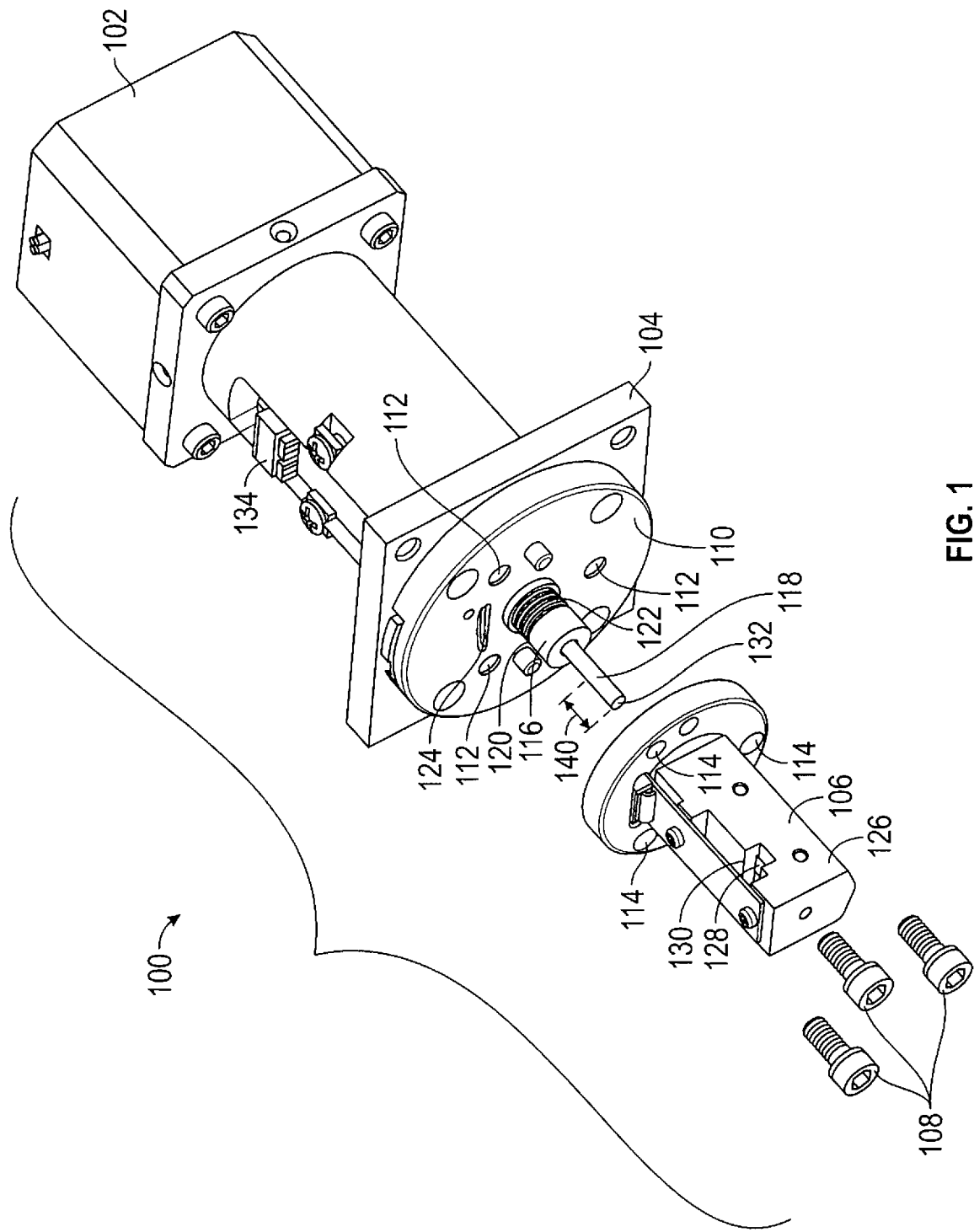
FIG. 1 is an illustration of an isometric view of one embodiment of the present disclosure.

Referring to FIG. 1, an illustration of an isometric view of one embodiment of a pump 100 is provided. The pump 100 may be sized to hold microliters for use with nano-scale columns for quick separation. An actuator 102 may be associated with the pump for operation. The pump 100 includes a pump main body 104 and a pump head 106.

The pump head 106 is removable from the pump main body 104 and may be affixed to the pump main body 106, such as by a plurality of bolts 108. The pump main body 104 includes a main body face 110, which may include a plurality main body threaded shafts 112 in number equal to the plurality of bolts 108. The pump head 106 likewise may include a plurality of pump head shafts 114, in a pattern matching that of the plurality main body threaded shafts 112 on the main body face 110. The pump head 106 and the pump main body 104 securely mate together at the main body face 110.

While the pump head 106 and the pump main body 104 mate together, a seal 116 provides the seal of the pump head 106 to the pump main body 104. The seal 116 is positioned about a plunger 118 and includes a spring 122 to apply compressive force against the seal 116 to force the seal 116 against a mating surface of the pump head 106. Where nano-scale volumes are desired, the plunger 118 may have a diameter of 0.03 inches, or slightly smaller, or of 0.93 inches, or slightly larger, or may be between, such as 0.62 inches. The stroke 140, or total movement, of the plunger 118 relative to the pump main body 104, may be 0.25 inches, or slightly smaller, or 0.75 inches, or slightly larger, or may be between, such as at 0.50 inches. The plunger 118 includes a plunger first end 132 which is introduced to the pump head 106. As can be appreciated, the stroke 140 of the plunger 118 and the diameter 408 of the barrel 402, also illustrated on FIG. 4, determine the volume of fluid transmitted during each load and injection cycle, which, by virtue of the values of the stroke 140 of the plunger 118 and the diameter 408 of the barrel 402, are measured in microliters.

The seal 116 may be a composite of a hard seal and soft materials or may be of single composition. In each instance the seal 116 includes a shoulder 120 so a surface is provided on seal 116 against which the spring 122 will apply force when in compression and which provides a location for the spring 122 without interfering with the mating and sealing of the pump head 106 and the pump main body 104.

The main pump body 104 may also include an electrical connector receiver 124 at the main body face 110 which provides a plurality of electrical connectors at or recessed from the main body face 110, which become contacted and engaged upon mating of the pump head 106 and the pump main body 104. Alternatively, the electrical connector receiver 124 may be associated with a processor controlling the main pump body 104.

The pump head 106 includes a pump head body 126 formed of a solid material. The pump head body 126 includes a pump head first side 130 on one side on which a strain gauge 128 is positioned.

Figure 2:
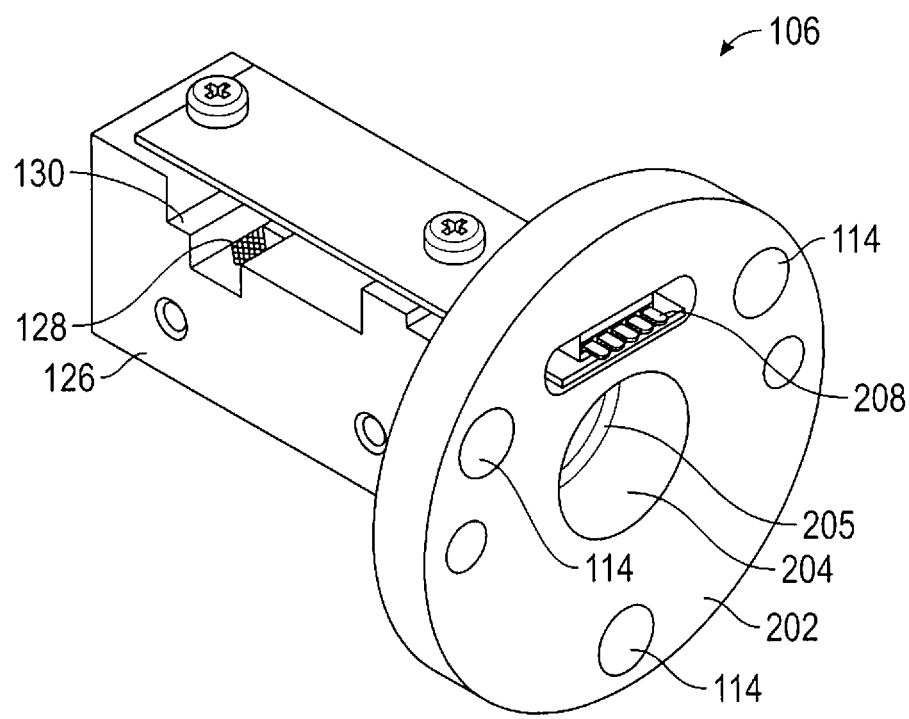
FIG. 2 is an illustration of an isometric view of one embodiment of the pump head.
Figure 3:
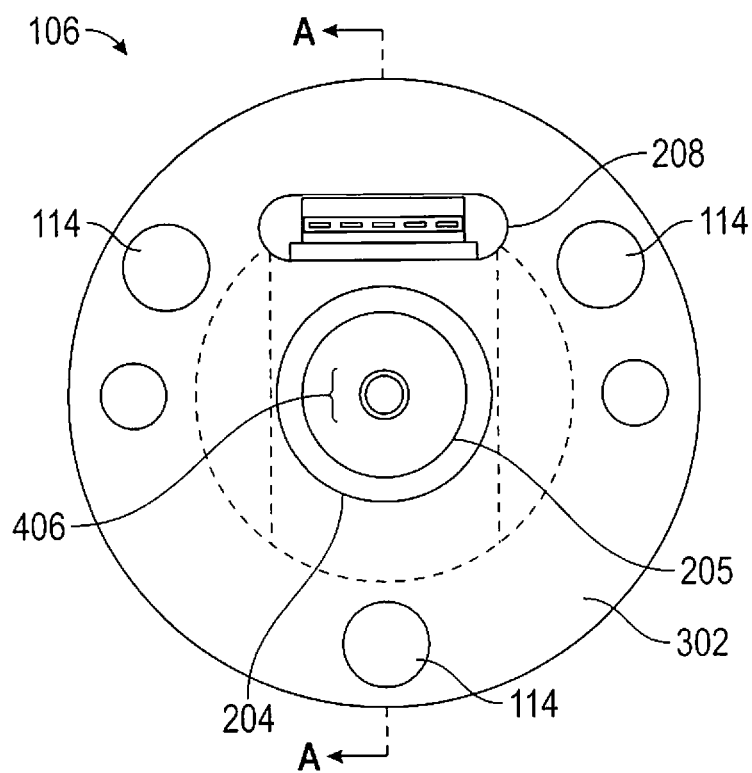
FIG. 3 is an illustration of the working end view the pump head of the present disclosure.

Referring to FIG. 2, an illustration is provided of an isometric view of one embodiment of the pump head 106. The pump head 106 includes a pump head face 202 which abuts the main body face 110. The pump head 106 includes a pump head opening 204 into which the seal 116 fits and against which the seal 116 seals. Centrally aligned with the pump head opening 204 is a seal 205, against which the seal 116 seats and whose side fits around the seal 116. A first orifice 302, shown in FIG. 3 provides communication to a barrel 402 which penetrates through most of the balance of the pump head 106. A set of electrical contacts 208 is provided at or extending beyond the pump head face 202. The set of electrical contacts 208 may electrically communicate with the electrical connector receiver 124. The set of electrical contacts 208 may be positioned for alignment with the electrical connector receiver 124, when positioned on the pump main body 104, upon mating of the pump head 106 and the pump main body 104. In such a construction, the set of electrical contacts 208 is positioned to contact and engage or otherwise communicate electrically with the electrical connector receiver 124 when the pump head face 202 of the pump head 106 abuts the main body face 110 of the pump main body 104 and is maintained in position by the plurality of screws 108. The set of electrical contacts 208 may be spring-loaded to ensure a complete contact and engagement against the electrical connector receiver 124. The interaction of the electrical contacts 208 and the electrical connector receiver 124 permits easy removal of the pump head 106 from the main pump body 104 and the likewise uncomplicated combination of the electrical contacts 208 and the electrical connector receiver 124 without the need for a user to make electrical connections.

Referring to FIG. 3, an illustration is provided of the working end view the pump head 106 of the present disclosure, identifying the first orifice 302 at the end of the pump head 106 into which the plunger first end 132 of the plunger 118 fits. At the opposite end, a second orifice 404 is provided for connection to other components. The position of the pump head shaft 114 is determined to ensure the pump head 106 properly mates to the pump main body 104 so, when the electrical connector 124 is provided on the pump main body 104, the electrical contacts 208 contact the electrical connector 124 on the pump main body 104. Because the first orifice 302 is the end of the barrel 402 as further illustrated in FIG. 4, the first orifice 302 has a diameter equal to the barrel diameter 408.

Figure 4:
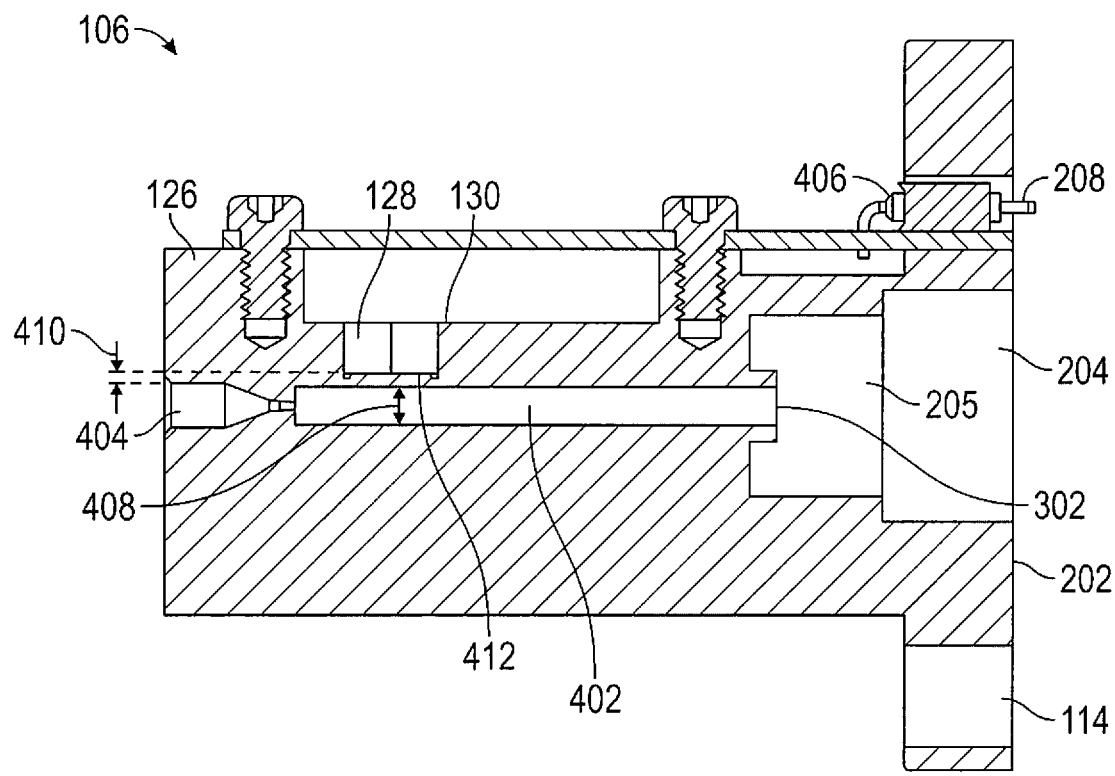
FIG. 4 is an illustration of a cutaway of the pump head along the line A-A of FIG. 3 of the present disclosure.

Referring to FIG. 4, an illustration is provided of a cutaway of the pump head along the line A-A of FIG. 3 of the present disclosure. Within the pump head body 126 is a barrel 402 connected to the seal seat 205. The pump head 106 includes a pump head first side 130 of the pump head body 126. Because the pump head body 126 is formed of one block of material, the pump head first side 130 defines one part of the outer surface of the barrel 402. A stain gauge 128 is positioned in the pump body head 126 at the pump head first side 130 at a measurement surface 412 so the distance 410 between the interior surface of the barrel 402 and the strain gauge 128 is sufficiently great to sustain the operating pressure of the pump 100 and is sufficiently small to permit the portion of the measurement surface 412, the portion intermediate the interior of the barrel 402 and the stain gauge 128, to deform proportionally to a change in the operating pressure without failing, i.e. leaking or exploding. The material selected for the pump head body 126 is sufficiently elastic to return to its original dimension prior to pressurization so that subsequent readings are consistent with an initial position. This return to original position is essential for proper functioning and measurement of internal pressure. Any combination of material and thickness which fails to return to its original position, i.e. it deforms under pressure, will fail to be usable. The distance 410 is a property of the material selected and the strength of the material of the pump head body 126, i.e. the extent to which the pump head body 126 elastically deforms under pressure. The barrel 402 is adapted to receive a supply of fluid at the second orifice 404, provided at the end of the barrel 402 opposite the first orifice 302 and the pump head face 202, and provides operation in connection with the plunger 118 by having an inner diameter 408 of the barrel 402 sized to the plunger 118.

A strain gauge 128 is affixed to the pump head body 126 at the measurement surface 412 at the pump head first side 130 distant the interior of the barrel 402 by the distance 410 to provide a signal consistent with the extent of the deformation of the barrel 402 adjacent the strain gauge 128, which be converted to a pressure reading. The extent of deformation is measured in respect to the original position, while not under pressure. The strain gauge 128 is thus affixed to detect deflection consistent with a pressure change. While the pressure could be monitored external the pump 100, such an arrangement would frustrate the operation of the pump 100 as it would require a further pressure control system. Beneficially, because instantaneous internal pressure can be determined, a valve may limit outflow from the pump 100 when below a desired pressure, ensuring a desired pressure is obtained. When desired, the rate of advance of the plunger 118 may then be controlled to maintain the desired pressure. The rate of advance of the plunger 118 may be varied in response to data from the strain gauge 128 to maintain the desired pressure.

A memory device 406, such as an erasable programmable read-only memory chip, is provided on the pump head 106 to process the data from the stain gauge 128 and to provide data output through the set of electrical contacts 208. Beneficially, the memory device 406 contains the calibration data for the associated pump head 106 for the signal from the strain gauge 128. As a result, a pump head 106 may be associated with any pump main body 104 and provide reliable pressure data to an external processor which can read the calibration data from the memory device 406 and the data regarding deflection of the strain gauge, to compute pressure. Similarly, a first pump head 106 may be removed from a pump 100, replaced with a second pump head 106, and used to provide reliable data without the need for calibration. Control of the pump 100, including the position and velocity of the plunger 118 and of the plunger first end 132, is accomplished by signals transmitted to the external processor and from the input/output connectors 134 on the pump 100, which are in communication with the electrical contacts 208 and the memory device 406.

Figure 5:
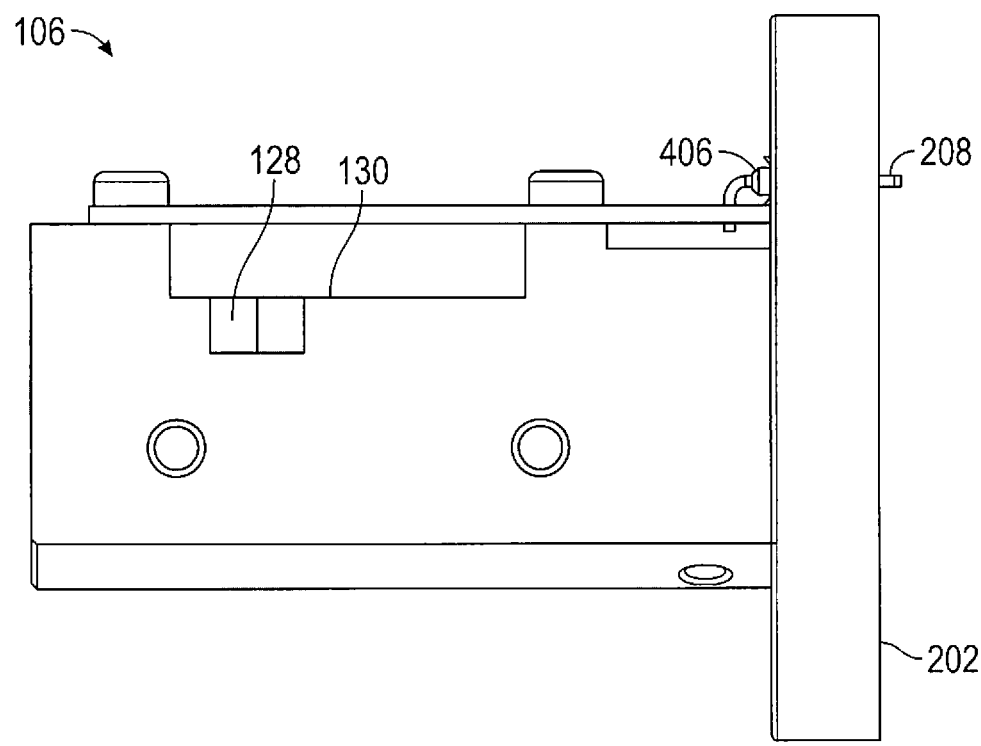
FIG. 5 is an illustration of a side view of the pump head of the present disclosure.

Referring to FIG. 5, an illustration is provided of an external side view of the pump head 106 of the present disclosure. The electrical contacts 208 associated with the memory device 406 are illustrated as are the pump head face 202, the first side 130 and the strain gauge 128.

The disclosure thus provides a pump 100 for high performance liquid chromatography having a pump main body 104 and a pump head 106 calibrated to measure pressure within. The pump main body 104 has a main body face 110 and may have an electrical connector receiver 124 on the main body face 110. The pump main body 104 further includes a slidable plunger 118 extending from the main body face 110 with a plunger first end 132. The pump main body 104 has a seal 116 extending from the main body face 110 and through which the plunger 118 passes.

The pump head 106 has a pump head body 126, a pump head first side 130, and a barrel 402 extending through the pump head body 126, where the barrel 402 is sized to fit about the plunger first end 132, the barrel 402 is bounded on one side by the pump head first side 130. The pump head first side 130 has a thickness sufficient to withstand an internal pressure within the barrel 402 and for the portion of the pump head body 126 intermediate the barrel interior and the stain gauge 128 to deform proportionally to a change in the internal pressure to provide a deflection. The pump head 106 also has pump head face 202 adapted to contact the main body face 110. Notably, the pump head 106 is adapted for detachable attachment to the pump main body 104, such as by bolts 108, so the pump head 106 can be removed and cleaned or replaced, without the need to recalibrate the pump 100. To aid in this connection, a set of electrical contacts 208 is provided at the pump head face 202 of the pump head 106 and is adapted to provide electrical communication to the electrical connector receiver 124 on the main body face 110 when the pump head face 202 contacts the main body face 110. The strain gauge 128 is affixed to the pump head 106 on the pump head first side 130 of the pump head body 126 and adapted to transmit a signal indicative of the deflection of the portion of the pump head body 126 at the measurement surface 412 distant the interior of the barrel 402 by a distance 410. The pump further includes a memory device 406 in electrical communication with the set of electrical connectors to provide calibration data to convert the signal indicative of the deflection to a pressure signal. Beneficially, the memory device 406 stores the calibration of the relationship between the deflection of the pump head body 126 and a pressure of a fluid within the barrel 402.

For use, the pump head 106 is secured to the pump main body 104 by the plurality of bolts 108, which draws the pump head 106 and the pump main body 104 into such proximity that the set of spring loaded electrical contacts 208 makes electrical contact with the electrical connector receiver 124. During operation, the plunger 118 is driven into the barrel 402, increasing the pressure therein and deforming the and which deforms the portion of the pump head body 126 intermediate the strain gauge 128 and the interior of the barrel 402 sufficient to withstand operating pressures. An internal pressure reading can immediately be determined. Each of the plurality of bolts 108 extends through a pump head shaft 114 and engages the threads, or other retention system, in the associated main body threaded shaft 112.

Upon initiation of loading, the plunger 118 is retracted into the pump main body 104 by the actuator 102, which results in displacement within the barrel 402 so that fluid is drawn into the pump 100 from a reservoir, such as through a 15 cm×200 µm steel tube. This is a filling step.

During the ejection or dispensing step, the plunger 118 is driven into the barrel 402. The rate of advance, and therefore the dispensing flow rate, may be controlled by a power supply and/or by computer software connected to the pump 100 at the input/output connectors 134. The position of the plunger 118 in the barrel 402 and its extent during the stroke 140 may be determined with mechanical systems such as optical encoders, or others known in the art, and the maximum extent may be defined and operation limited by mechanical stops or limit switches. The plunger 118, which may have a substantially uniform cross-section, is adapted to slidably move within the barrel 402 and is sized to ensure effective operation during the loading and ejection of fluid.

As the fluid is compressed in the barrel 402, the barrel 402 is pressurized, causing deformation of the portion of the pump head body 126 on the pump head first side 130 between the interior of the barrel 402 and the strain gauge 128, and therefore and alteration of the stain gauge 128, which communicates the pump-head specific calibration from the memory device 406. Power is supplied to the memory device 406 and strain gauge 128 from the electrical connector receiver 124. A resulting signal, indicative of the pressure within the barrel 402, is then provided to the input/output connectors 134, and then to an external processor, through the set of electrical contacts 208 and the electrical connector receiver 124. Alternatively, a processor, wireless transmitter and power supply could be included on the pump head 106 to eliminate the need for the electrical connector receiver 124 and the set of electrical contacts 208.

Due to the volumes involved, refilling of the pump 100 may be accomplished is less than 2 minutes. Since typical flow rates used in capillary columns (100-150 µm i.d.) range from 100 to 500 nL/min, an isocratic separation can be easily completed without the need to refill the pump 100.

The nano-scale operation of the pump 100 is made possible by integration of parts may be further augmented by sufficient and operable 360 micrometer zero-dead volume fittings, and by material selection. Diamond-coated surfaces may be utilized where beneficial. The plunger 118 may be constructed of a work hardened super alloy, such as MP35N, a nickel-chromium-molybdenum-cobalt alloy providing ultra-high strength, toughness, ductility and high corrosion resistance—particularly from contact with hydrogen sulfide, chlorine solutions and mineral acids (nitric, hydrochloric, and sulfuric). Moreover, the nano-scale operation of the pump 100 permits portability, such as being battery-operated, while being light weight, having low mobile phase consumption and generating low waste. The pump 100 may be used to generate an operating pressure of 172.37 MPa (25,000 psi), for example, but the operating pressure may be lower or higher depending on need. Similarly, the pump 100 may have a pump volume capacity of 24 µL for example, though the pump volume capacity may be sized to be greater or smaller. Further, the pump 100 permits the use of a sample volume as low as 10 nL, for example, or higher, such as 60 nL, for example, for injection. Similarly, the sample volume may be resized as desired. As a result of the structures provided herein, the maximum and minimum dispensing volumetric flow rates of the pump 100 are controllable, such as, for example, 74.2 µL/min and 60 nL/min, respectively. This may further be accomplished by providing the loop, such as of 506 of 5.08 cm×75 or 150 µm inner diameter, most often of stainless steel tubing, to carry the mobile phase to the column during injection (dispensing).

The terms and expressions which have been employed in the foregoing specification are used therein as terms of description and not of limitation, and there is no intention, in the use of such terms and expressions, of excluding equivalents of the features shown and described or portions thereof.

We claim:

1. A pump for high performance liquid chromatography comprising:
    a pump main body,
        the pump main body having a main body face,
        the pump main body having a plunger with a plunger first end,
        the plunger extending from the main body face,
        the pump main body having a seal,
            a spring intermediate the seal and the main body face,
            the plunger passing through the seal;
    a pump head,
        the pump head having a pump head body,
            the pump head body having a pump head first side,
            a barrel in the pump head body,
                the barrel sized to fit about the plunger first end,
                the barrel bounded on one side by the pump head first side,
            the pump head body having a measurement surface at a distance from an interior surface of the barrel sufficient to withstand an internal pressure of the barrel, the distance sufficient for the pump head body to deform proportionally to a change in the internal pressure to provide a deflection;
        the pump head having a pump head face,
        the pump head face adapted to contact the main body face,
        the pump head adapted for detachable attachment to the pump main body;
    a set of electrical contacts at the pump head face of the pump head,
    a strain gauge affixed to the pump head on the the pump head first side of the pump head body at the measurement surface and adapted to transmit a signal indicative of the deflection, the strain gauge in electrical communication with one of the set of electrical connectors and a memory device;
        the memory device containing a calibration value of the signal indicative of the deflection to pressure, and
        the memory device in electrical communication with the set of electrical connectors; and
    an electrical connector receiver on the main body face,
        the electrical connector receiver adapted to contact the set of electrical contacts,
        the set of electrical contacts adapted to electrically communicate with the electrical connector receiver,
        the electrical connector receiver adapted to supply a resulting signal indicative of the pressure within the barrel to an input/output connector on the pump main body,
            the resulting signal indicative of the pressure within the barrel including
                the signal indicative of the deflection and the calibration value, and
        the electrical connector receiver adapted to supply power to the memory device and the strain gauge.

2. The pump of claim 1, wherein the set of electrical contacts at the pump head face of the pump head is spring-loaded.

3. The pump of claim 1, wherein the the input/output connector is adapted for communication with an external processor.

4. The pump of claim 1, wherein the pump head body is formed of a single block of material.

5. The pump of claim 4, wherein the barrel has a first orifice adjacent the seal and a second orifice at the opposite end of the barrel, the barrel adapted to receive a supply of fluid at the second orifice.

* * * * *